US011887406B2

(12) United States Patent
Gravelle

(10) Patent No.: US 11,887,406 B2
(45) **Date of Patent: *Jan. 30, 2024**

(54) VEHICLE-BASED ELECTRONIC TOLL SYSTEM WITH INTERFACE TO VEHICLE DISPLAY

(71) Applicant: Amtech Systems, LLC, Albuquerque, NM (US)

(72) Inventor: Kelly Gravelle, Poway, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/674,884

(22) Filed: Feb. 18, 2022

(65) Prior Publication Data

US 2022/0180668 A1 Jun. 9, 2022

Related U.S. Application Data

(63) Continuation of application No. 17/141,400, filed on Jan. 5, 2021, now Pat. No. 11,257,303, which is a continuation of application No. 16/656,939, filed on Oct. 18, 2019, now Pat. No. 10,896,552, which is a continuation of application No. 16/166,791, filed on Oct. 22, 2018, now Pat. No. 10,489,987, which is a continuation of application No. 14/681,369, filed on Apr. 8, 2015, now Pat. No. 10,121,289.

(60) Provisional application No. 61/978,508, filed on Apr. 11, 2014.

(51) Int. Cl.

| | |
|---|---|
| ***G07B 15/02*** | (2011.01) |
| ***G07B 15/06*** | (2011.01) |
| ***G07B 15/00*** | (2011.01) |

(52) U.S. Cl.

CPC ............ *G07B 15/02* (2013.01); *G07B 15/00* (2013.01); *G07B 15/063* (2013.01)

(58) Field of Classification Search

CPC ........ G07B 15/00; G07B 15/02; G07B 15/06; G07B 15/063

See application file for complete search history.

(56) References Cited

U.S. PATENT DOCUMENTS

2005/0179563 A1* 8/2005 Kelley ............... G06Q 30/0284 705/13
2010/0021015 A1* 1/2010 Bissett ................... G07C 9/257 382/115
2010/0287038 A1* 11/2010 Copejans ................ G01S 19/14 342/357.29
2012/0215594 A1* 8/2012 Gravelle ............. G07B 15/063 705/13
2014/0180773 A1* 6/2014 Zafiroglu ............ G08G 1/0112 705/13
2014/0297220 A1* 10/2014 Raffa .................... B60R 16/037 702/150

* cited by examiner

*Primary Examiner* — Andrew W Bee
(74) *Attorney, Agent, or Firm* — Jacob Neu; Lucas Yordy; Bradley Arant Boult Cummings, LLP

(57) ABSTRACT

A system carried by a vehicle for computing tolls that interfaces with vehicle data entry and display components. The system uses these components to display toll-related information and to accept user input for toll-related information. The system may also incorporate vehicle sensors including seat occupancy sensors, infrared sensors and cameras to determine vehicle occupancy for tolling purposes.

20 Claims, 3 Drawing Sheets

VEHICLE-BASED ELECTRONIC TOLL SYSTEM WITH INTERFACE TO VEHICLE DISPLAY

CROSS-REFERENCE TO RELATED APPLICATIONS

This patent application is a continuation of application Ser. No. 17/141,400 filed Jan. 5, 2021, which is a continuation of application Ser. No. 16/656,939, filed Oct. 18, 2019 (now U.S. Pat. No. 10,896,552), which is a continuation of application Ser. No. 16/166,791, filed Oct. 22, 2018 (now U.S. Pat. No. 10,489,987), which is a continuation of application Ser. No. 14/681,369, filed on Apr. 8, 2015 and entitled "Vehicle-based Electronic Toll System With Interface to Vehicle Display" (now U.S. Pat. No. 10,121,289) which claims benefit under 35 USC 119(e) to provisional Application No. 61/978,508 filed Apr. 11, 2014, all of which are hereby incorporated herein by reference.

DESCRIPTION OF THE PREFERRED EMBODIMENT OF THE INVENTION

Figure 1:
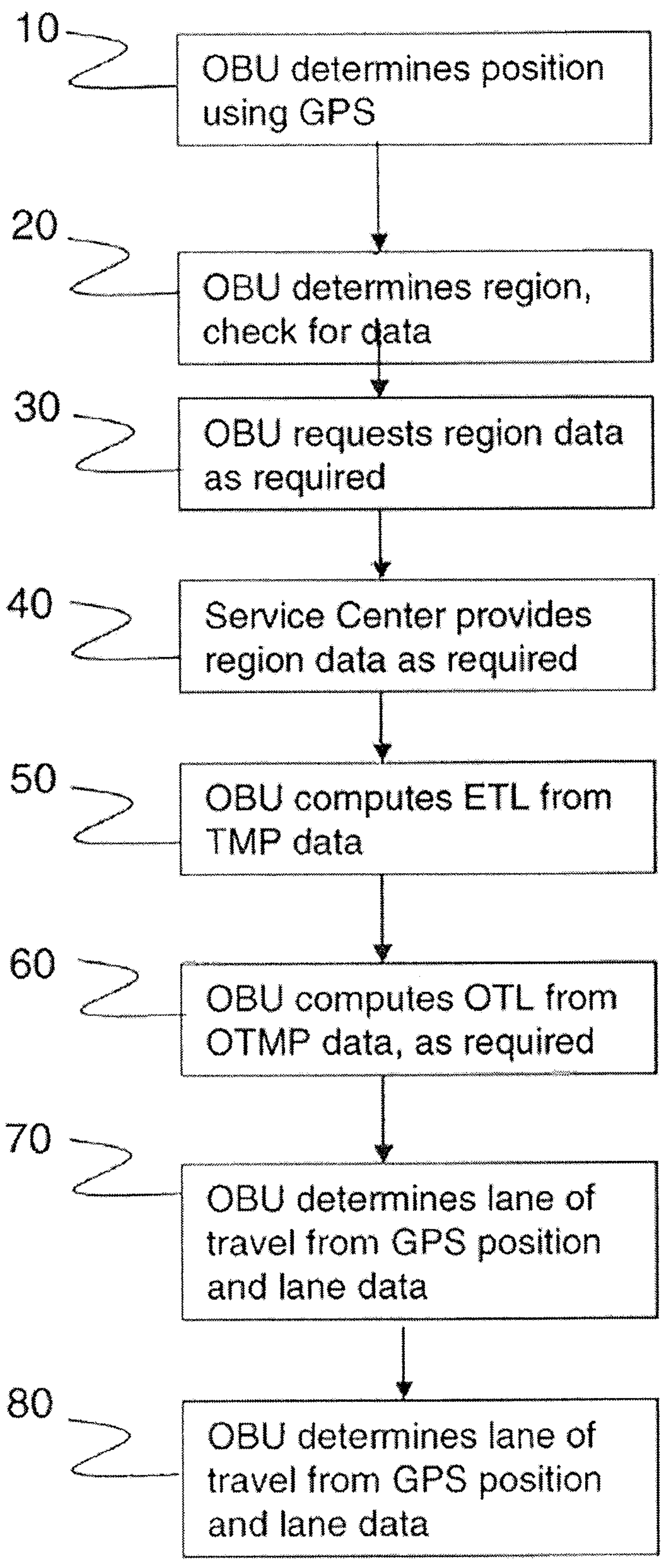
FIG. 1 is a flow diagram of a preferred exemplary embodiment of the inventive method.

Referring to FIG. 1, in step 1 an onboard unit (OBU) carried by a vehicle determines its geographic position using a global positioning satellite system (GPS) receiver. Next, the OBU determines the region in which the vehicle is located, and checks to see whether it has necessary data in memory to compute tolls in that region. In step 3, if the OBU determines that its data for the region is somehow deficient (e.g., incomplete or not current) then it requests data for the region from a service center. If required, the service center responds by transmitting the needed data in step 4.

Note that these steps illustrate just one of many equivalent ways of implementing the inventive method. For example, in place of steps 2-4, the OBU could periodically transmit its location and/or its identity to a regional, national, or global service center, and the service center could then respond according to its records with whatever data a vehicle in with those latitude and longitude coordinates might require. Alternatively, the service center could even provide a highly detailed digital map of the region including all toll and non-toll roadways. However, a major goal of the invention is to minimize communications between vehicles and service centers. Steps 2-4 minimize communications by avoiding unnecessary requests from the vehicle.

In step 5 the OBU uses the compact travel monitoring point (TMP) data provided by the service center to compute an expected travel lane of travel (ETL) for each TMP. More accurate toll computations can be made by comparing the GPS positions of the vehicle to a line of expected positions for a particular toll lane than by comparing it to a single point. Comparison to a line is less susceptible to errors caused by receiver offset, temporary loss of GPS signal by the receiver, reflections, and other sources of GPS error.

Multiple GPS data points are samples when the vehicle is proximate to an ETL (as many as possible) so that the OBU can compare these multiple points to an ETL in an effort to average out errors in determining whether it is likely that the equipped vehicle actually traversed the ETL. In an embodiment, the deviations from each GPS fix to the ETL are adding together. Deviation is defined as the distance from the GPS fix to the closest point on the ETL. One direction perpendicular to the line is considered positive, the other negative. The ETL is considered traversed if the absolute value of the total deviation is below a threshold. In another embodiment, a least mean squared comparison is calculated, and a determination made whether it is below a threshold. Typically, an exemplary algorithm will throw out extremes of the data, for example, one or more points, to eliminate the effect of outliers.

As will be discussed below in reference to FIG. 2, ETLs can be of any shape. However, for the sake of efficient communications between the vehicle and the service center, ETLs are preferably shapes which may be described with just a few parameters, e.g., a straight line or parabolic curve.

In step 6, the OBU computes an offset travel lane (OTL) from the data for each offset travel monitoring point (OTMP) provided by the service center. An OTL is just an ETL computed in a different way. Since many travel highway travel lanes are parallel to each other, once the shape of a first lane has been established, lanes parallel to the first can be described by simply giving the coordinate of the starting point of the first lane and the longitude and latitude offset for the starting point of each of the lanes parallel to the first lane.

In step 7, the OBU uses data from its GPS receiver and the computed travel lanes to determine in which lanes the vehicle is traveling. In step 8 the OBU determines what toll is therefore expected.

Figure 2:
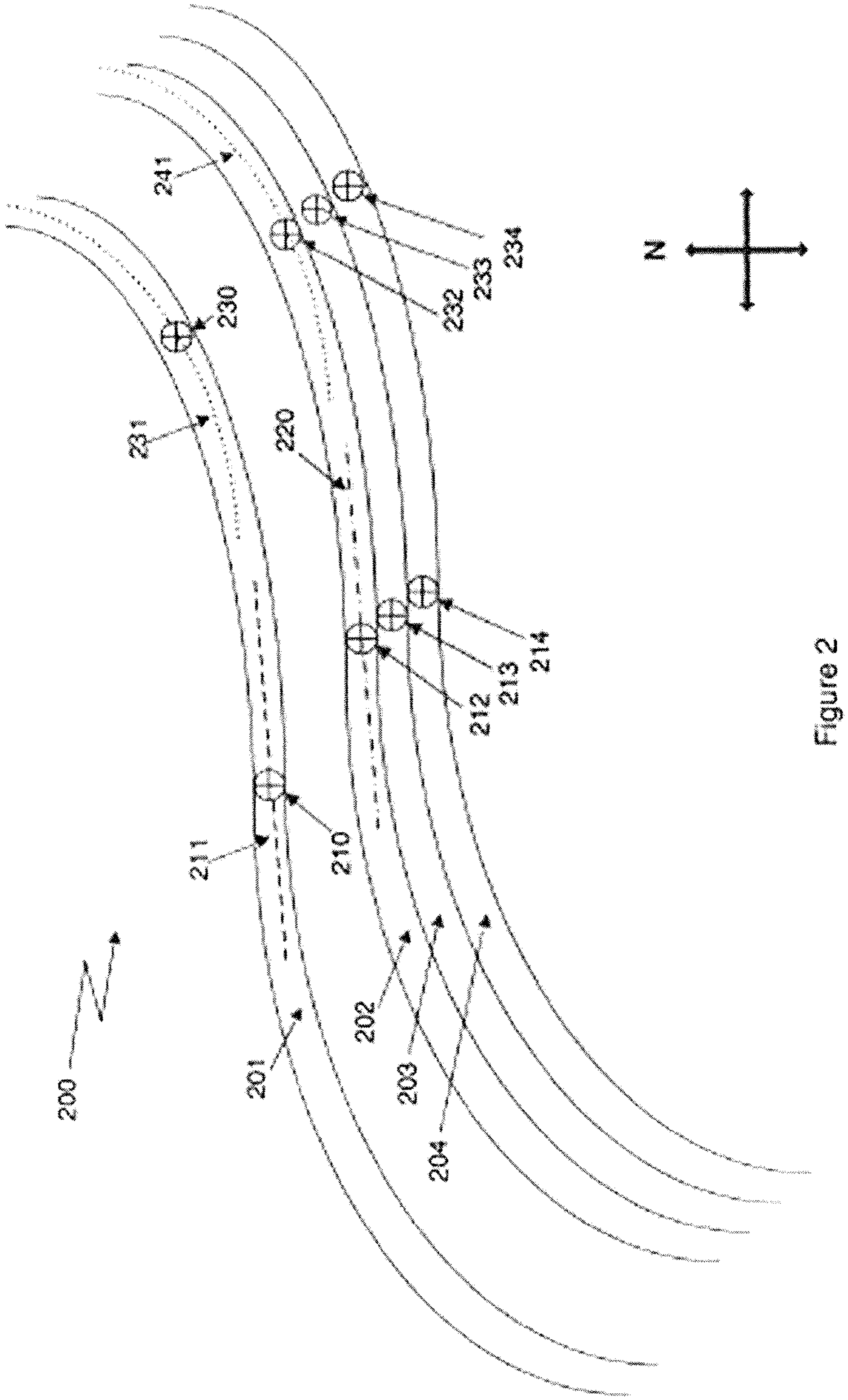
FIG. 2 is a plan view of a section of highway 200 over which certain data is overlaid to illustrate the contents of the database used by an OBU for purposes of the invention.

FIG. 2 depicts a section of highway 200 and exemplary associated database information. There are four lanes of traffic 201-204. Traffic monitoring point (TMP) 210 is at a particular latitude and longitude and has an associated expected travel lane (ETL) 211 which is a straight line. Offset lane points (OLPs) 212-214 could be described in the database simply by the delta latitude and longitude of their position relative to TMP 210. OLP 212 is shown to have an ETL 220 equivalent to that of TMP 210. The length and directions of the two ETLs are the same. The ETL 220 is merely translated in latitude and longitude from that of ETL 211 exactly as OLP 212 is translated from TMP 210. Similar ETLs (not shown) may be computed for offset travel monitoring points 213 and 214.

Determining the exact lane used by the vehicle may be significant. For example, lane 201 might be a high-occupancy vehicle lane for which the toll is different from ordinary traffic lanes 202-204.

TMP 230 has an ETL 231 which is a parabolic curve. As will be appreciated in the known mathematical, geometric, and computational arts, curves in two dimensional space may be described parametrically in any of several different ways. For instance, a simple curve can be described by a point of, a direction, an arc length, and a curvature. The same curve could be given in a certain range by the coefficients of powered terms (y=ax+bx2+cx3 . . . etc.) OLPs 232-234 could be described in the database by the delta latitude and longitude of their position relative to travel monitoring point 230. Associated with off traffic monitoring point 232 is ETL 241, which is equivalent to ETL 231, but geographically offset from ETL 231 just as OPL 232 is offset from TMP 230.

Figure 3:
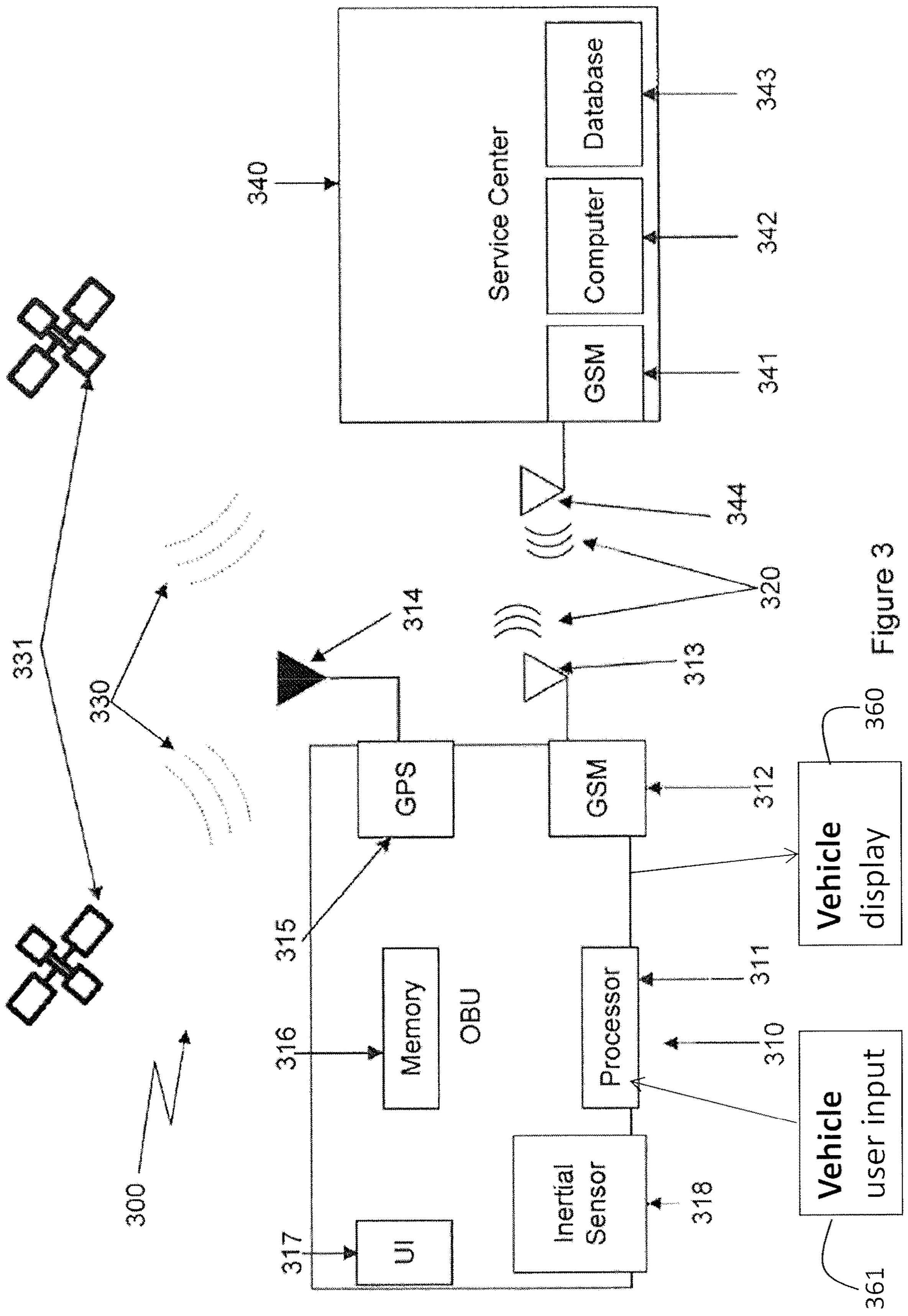
FIG. 3 is a schematic diagram of the vehicle and service center equipment used by the toll computation system.

FIG. 3 shows the vehicle and service center equipment used by the toll computation system 300. The onboard unit (OBU) 310 is carried by a vehicle (not shown.) The OBU 300 includes a GPS receiver 315, which receives GPS signals 330 from GPS satellites 331. From these signals, the GPS receiver 315 determines the latitude and longitude coordinates of the geographic position of the receiver, and therefore of the vehicle. In practice, the GPS receiver 315 and other OBU components need not be incorporated into the OBU 310 as shown, but in an embodiment can be carried by the vehicle externally to the OBU and in communication with at least one other OBU component as may be required to perform the functions herein described.

An alternative approach to the ETL/OTL approaches is to set up delimiter zones which are monitored by the OBU. A TMP could for example be defined by a free form polygon consisting of a set of points. After each position fix the OBU checks to see if the GPS fix point is within the boundaries of the free form polygon, and if so declares that the vehicle has traversed the TMP. To get the benefit of averaging, an alternative approach is as follows. After an initial GPS fix establishes a position within the boundaries of the polygon defining the TMP, the OBU takes a minimum sample size (SS) of GPS fixes. It is desirable that the sample size should be as large as possible, so this will typically be set based on the time the vehicle is expected to remain in the TMP. Determination of whether the vehicle is in the TMP can simply be a threshold percentage of the number of samples taken within the TMP defining polygon. For example, if 20 samples are taken (SS=20), and the threshold for determining traversing the TMP is 75%, the TMP will be determined to have been traversed if at least 15 of the 20 GPS fix samples are determined to be inside the TMP defining polygon.

The OBU 310 contains a digital computing apparatus including a processor 311, which may be any kind of microcontroller, microprocessor, programmable logic device, etc., and memory 316, which contains space for data and/or instruction codes that may be required by the processor 311.

The OBU 310 is adapted to communicate with service center 340. For purposes of illustration, The OBU communication link 312 and service center communication link 341 are depicted as Groupe Special Mobile (GSM) transceivers with respective antennas 313 and 344 communicating using cellular telephone radio signals 320. In practice, a communications link may be established between the OBU 310 and service center 340 in any number of ways. The service center 340 may simply be connected to a regional telephone company. The OBU 310 may either use a GSM link 312 as depicted or any other wireless means to connect to a telephone or data communications network, such as but not limited to direct private radio channels and satellite modems.

Via the communications links, the OBU 310 obtains regional travel monitoring point and related data from the database 343 located at the service center as controlled by the service center computer 342. The OBU 310 stores this data in memory 316. The OBU processor 311 then uses this data to compute expected travel lanes, which in turn is used in combination with GPS receiver 315 data to compute the expected tolls.

On occasion, GPS signals 330 may be blocked or distorted in a manner that prevents proper functioning of GPS receiver 315. This may occur, for instance, in mountainous terrain or in urban "canyons" where skyscrapers affect the receipt of GPS signals 330 at ground or sea level. At such times it is particularly beneficial for the OBU 310 to include an optional inertial sensor 317, such as a micro-electromechanical system (MEMS) accelerometer or gyroscope. Using such a device, the processor 310 may be able to infer the current position of the vehicle from a past GPS coordinate.

The OBU 310 also optionally contains a user interface (UI) 317. User interfaces can be quite complex, including such features (not shown) as a visual display or lights, speakers or audio indicators, keypads or manual input devices, a printer output, or a link to a personal computing or communications device. The UI 317 could also be as simple as, for example, a set of "nomination" switches (not shown) by which a vehicle occupant inputs to the OBU 310 the number of occupants of the vehicle for the purposes of computing a toll discount for ride sharing.

In an embodiment, the OBU is interfaced to an on board diagnostic port (OBD) on the vehicle. At a minimum this interface provides power to the OBU and give the OBU access to the Vehicle Identification Number VIN to ensure that the toll is being collected for the right vehicle/account.

As will be apparent to those skilled in the art in light of the foregoing disclosure, many alterations and modifications are possible in the practice of this invention without departing from the spirit or scope thereof. The foregoing description of preferred embodiments is by way of example, and is not intended to limit the scope of the invention in any way.

GPS Tolling applications have a need in some circumstances to accurately determine the lane of travel of a vehicle in order to determine the proper toll or charge. Please see the attached sketch.

An on board unit (OBU) is installed in a tolled vehicle contains a GPS receiver and a common carrier communications module such as a GSM modem to communicate data to a service center server, and a processor and memory.

A service center will from time to time download Travel Monitoring Points (TMP) within the lane of interest appropriately coded using GPS coordinates. TMP data consists of the GPS coordinates, a vector direction, and a length. These monitoring points are downloaded based upon requests from the OBU for such data in a region based on the known location of the OBU determined by GPS fixes performed from time to time. TMP data is stored in OBU memory and collectively allows for the determination in the OBU of Expected Travel Lines (ETL) that correspond to the lane being monitored in the local vicinity of the current position of the OBU. Because the ETL can be determined from the TMP data (a GPS point coordinate, a direction (say in degrees from North) and a length) ETL descriptions are compact, requiring limited data transmission bandwidth and more efficient storage of ETL's in memory so a larger number of these can be stored given the memory available on the OBU In order to improve the accuracy of determination of lane of travel, multiple GPS fixes can be taken when the OBU believes it is in the vicinity of an ETL. Individual GPS fixes may contain errors sufficient to cause incorrect determination of lane, but by taking multiple GPS fixes while in the vicinity of the ETL, multiple data points can be compared and fit to the ETL in the vicinity, thus averaging any errors that occur in individual GPS fixes. If an analysis of the multiple data points versus the ETL meets certain criteria, it can be concluded that the vehicle in which the OBU is installed is indeed in the travel lane. For example, one can calculate the average offset for each GPS fix vs the closest point on the ETL. If the magnitude of the sum of the total error of all the data points is less than a certain threshold, the OBU is determined to have traversed the ETL with a high degree of certainty. Other well known curve fitting techniques such as rejecting a small numbers of data outliers can also be used. Traversing the ETL establishes that the OBU and associated vehicle have crossed the TMP, this data is then used to determine that a toll payment is or is not due for travel upon the particular segment of road in the monitored travel lane.

It should be noted that other suitable mathematical functions than a line may be used to represent the expected travel trajectory of the vehicle within a lane or roadway, such as a parabola. The key concept is to be able to represent at least parts of the expected travel trajectory efficiently within memory so that the expected travel path can be compared to the actual GPS data at multiple points to take advantage of averaging to mitigate GPS errors, and thus make a much more accurate determination of the lane or roadway of travel of the vehicle.

This technique can be used in conjunction with a category determination algorithm within the OBU. The roadway and/or lane of travel are determined in conjunction with the technique described above. In addition to the data described above, a toll rate or toll rate category is downloaded with the other data and associated with the TMP's and/or identified roadways. Roadway determination can be done as described above for lane determination, but with thresholds suited to the size of the roadway and the potential for confusion with other non-tolled road facilities in the vicinity. The OBU then collects toll data and collects this information in memory for use in calculating the total toll or use charges later. For example, the OBU can either interface to the existing odometer or generate "virtual" odometer data by taking regular and relatively frequent GPS fixes to calculate the distance traveled by the vehicle by summing all of the individual distances between GPS fixes. In one embodiment the toll charge is calculated as a fixed rate with the mileage determined by the virtual odometer. For example, if the toll rate is established at $1.00 per mile in the special use lane (for example a designated High Occupancy Toll (HOT) lane), but 0.50 a mile in the General Purpose Lanes, the proper toll is accumulated in the memory of the OBU, based upon which part of the roadway the user is driving on.

Alternatively, a fixed toll charge could be accumulated for each TMP that is traversed, or specific toll fees could be associated with each individual TMP and accumulated in memory as the vehicle passes each such point. This data is offloaded over the common carrier link at defined times to the service center so that it can be used to generate a settlement activity with the authorized user of the OBU in question. In addition, the driver may be able to declare a specific status used to calculate the toll charge, such as the vehicle occupancy. Policy makers frequently will allow High Occupancy Vehicles to use designated lanes for no or a lower charge, the user or driver can "nominate" his vehicle for such treatment by entering the data on the OBU, for example by using a nomination switch that sets the occupancy status for the purpose of toll calculation.

When Travel Monitoring Point and related data are downloaded from the service center, this data is sent with a time and date stamp and a region code. When an OBU enters a specific region, it provides the service center a report of the data contained in its memory including the region or regions retained and the date stamp. The service center can then determine whether the OBU has the correct data in its memory to collect the correct toll, based on the region(s) available and the date stamp(s). Therefore it only downloads new TMP data to the OBU if this is necessary, thus minimizing the data sent over the common carrier link to keep data charges as low as possible. However, if the OBU data for the region in question is not available or outdated, this data is then downloaded to the OBU. For typical commuters who use the same regional roads frequently, these updates will be limited in frequency thus limiting the data usage. As commuters leave a defined region or a radius from a center point, the system can send need TMP's to the unit, and identify other TMP's for removal so that the memory available to store TMP's in the unit does not overflow. Alternatively, the unit can automatically decide which points to discard based on those that are furthest away, and the service center will do a parallel determination so it is keeping track of the points held by that unit. Points are numbered and serialized so that at any time the service center can compare the series set that is stored. For example if queried by the service center an OBU it can respond that it has the following series 300-423; 555-900; 875-1050; 1139-1300.

As an OBU moves beyond the border of a region, the service center will add TMP's and remove others (or allow them to be automatically removed as above) by sending coded messages to the OBU. These can consist of single points or groups or series of points. For example, a rule may be set where no updates are sent until 100 points should be updated in the OBU. These can then be transmitted as a single message with a series of the 100 points to be added and then the 100 to be removed. Further, as the OBU moves out of a defined region and exchanges TMPs, the system avoids the jitter that can occur when vehicles move in and out of a new region. In this situation a lot of TMP exchanges can occur as a vehicle crosses a border area between regions that demarks where TMPs should be exchanged. This could generate a lot of undesired data traffic on the network if the OBU is frequently in this "border" area. This effect can be minimized by designing hysteresis into the logic so that a vehicle that travels out of a region a distance and start to exchange TMPs does not reverse the process of TMP updates upon a simple return to the border area but must come back into the region a specified distance before TMP's are exchanges in the reverse direction. Selection of proper hysteresis parameters either based on distance or the number of points to be exchanged will ensure data traffic is minimized even in border areas that are frequently crossed.

It is also possible that with the proper amount of hysteresis in the system the idea of regions can be eliminated entirely. An alternate TMP update plan could be based on simply maintaining as many of the points that can be held in memory that are closest to the current travel point subject to hysteresis over a certain distance or number of points.

The approach of comparing known Expected Travel Lines and Travel Monitoring Points with on board toll metering has the significant advantage that tolls can be determined without the need to send frequent GPS fixes to essentially track the vehicle at the service center. This again minimizes the amount of data traffic that must be sent over the common carrier link, and allows for users who are concerned about privacy to use the system without being continuously tracked.

Further, the invention can also include an RF transmitter to transmit data that identifies the vehicle such as the license plate number or the VIN. This data can then be received by either manual or automated toll or HOT enforcement systems to help eliminate vehicles that are operating with the GPS Toll device from further enforcement consideration on the basis that proper payment is assumed to have been received from the GPS Toll system. For example, in a Toll road application where video enforcement is used, the device broadcasts the license plate number over the RF link and received at a roadside receiver, proximate to the video enforcement system. This license plate data is time stamped. When the vehicle passes by the enforcement cameras, the video enforcement system will take a picture of the license plate of the vehicle. This photo will be analyzed using automatic plate reading software to generate an automated read of the license plate number and also time stamped. A computer can then be used to compare the automated plate reads to the plate numbers broadcast indicative of GPS Toll equipped vehicles received within a time window, such as 30 seconds. If they match, the automatic plate read can be removed from further enforcement consideration automatically, thus reducing the burden on the enforcement processing system that would otherwise be required.

The RF transmission of vehicle identification data can also be used in conjunction with a manual enforcement process. Currently, most HOT lane systems are enforced manually, as a police officer or other official must observe the occupancy status of the vehicle manually. In a HOT system, where the user only pays a toll if the vehicle occupancy is below a threshold (or where the toll amount depends on the occupancy) the police officer must also observe if an authorized toll payment device is in the vehicle in addition to occupancy. While occupancy status is usually fairly easy for an officer to observe, the presence of the GPS Toll payment device may not be. Therefore, absent the transmitter feature officers may end up stopping a larger number of motorists who turn out to have a compliant device in the vehicle because the officer could not observe the device. If this number is too large, enforcement may become prohibitively expensive and inefficient, plus very inconvenient for motorists pulled over incorrectly.

However, with the use of a transmitter on the GPS toll device to transmit vehicle identification data and a corresponding receiver in the officer's vehicle or otherwise accessible to the officer, the officer can more easily filter out authorized GPS Toll users by matching the vehicle license plate to the locally transmitted set of authorized plates. In such a way the officers can be assured they will not stop vehicles that have properly authorized devices, rendering manual enforcement of HOT or any other toll, parking or other forms of payment for services, much more practical.

The RF transmitter will typically be a UHF transmitter permitted by FCC regulations. For example, the transmitter could be a simple low power single frequency 915 MHZ transmitter using ASK modulation, as used in tags currently used by the Inter Agency Group (E-ZPass) in the Northeastern US. Other transmitters can be used such a low power UHF FSK transmitter, Frequency Hopping Spread Spectrum (FHSS) transmitter, or a Direct Sequence Spread Spectrum (DHSS) transmitter These are just examples of the types of transmitters that can be used and many others are known in the art. Typically, vehicle identification data will be encrypted so as to protect this data from eavesdropping and also to validate that the data comes from an authorized device and not a counterfeit or cloned device. Data encryption can employ well known encryption techniques such as the standard AES algorithm, or an asymmetric encryption algorithm such as RSA. In each case the chosen type of transmitter and encryption technique are used in conjunction with the correlating type of receiver for reading the data and decryption for decoding data.

The OBU device also optionally implements a two way low power UHF transceiver for bidirectional communication with a driver interface module (DIM) mounted at a location convenient to the driver in the vehicle. The implementation of a low power transceiver on both ends is implemented using off the shelf transceiver chips well known in the art. The OBU is typically powered by the vehicle and therefore turns on the transceiver a high percentage of the time (high duty cycle) so that it can receive a message over the UHF link from the driver interface module at any time. The driver interface module is optimized for low power operation and designed to have a long life (several years) on commercially available batteries, therefore runs on a low duty cycle, sending a query message to the OBU relatively infrequently (say once every 5 seconds) so that the duty cycle of operation can be kept low. If the OBU has a message for the DIM it then sends the message at that time, otherwise the DIM goes back to sleep. The DIM can also send messages to the OBU asynchronously at any time since the OBU receiver is operating at close to 100% duty cycle.

The DIM consists of a microcontroller, a transceiver chip, and supporting circuitry well known in the art and is battery powered. It also has an interface from the microcontroller to an LCD display, an input button and a four position slide selector switch, and a piezo buzzer. The slide switch allows the user to select the occupancy nomination for the vehicle. A messaging protocol is set up to allow the DIM to communicate with the OBU. When the slide switch settings are changed on the DIM, the DIM will communicate the occupancy level to the OBU so this data can be included in the toll transaction data collected by the OBU and used to compute the proper toll. The positions of the slide switch designate occupancy of 1, 2, 3 or more people in each of 3 positions. A fourth position is used to communicate to the LMU that the user wants to turn the toll collection function off completely. This can be used if the user in driving proximate to a tolled lane or road, but is not in the lane and wants to eliminate all possibility of being billed for an erroneous toll. In another embodiment the presence of the DIM proximate to the OBU can be set to automatically disable collection of any tolls. This may be used by a driver you might for example loan his son the car, but not want him to be able to charge tolls. Other functions of the OBU can be enabled or disabled according to the desired configuration for this system. Another function of the DIM is to display the active toll rate to the driver so they can use this information to decide on whether they want to access the tolled facility or lane. This can be of particular importance when the system is used on a congestion pricing type of environment. The updated toll rate or applicable discount to a standard toll rate is broadcast for the application section of roadway and stored in the OBU. When the OBU determines that it is approaching a decision point, which is handled as a special case of a toll point in the OBU, it sends a message to the DIM on the next query message sent by the DIM. The message commands the DIM to display the upcoming toll amount and to send a configurable "beep" message letting the driver know toll info is being communicated. The OBU can also look at the time of day information it receives from the common carrier network, and based on the date/time can determine if the LCD message should be back-lit, and indicates this in the message to the DIM. In this way the DIM preserves power by only displaying a backlit message when necessary. The driver can always recall the last display message by pressing a push button on the DIM.

The DIM provides the user a set of functions that are designed, when taken together, to provide minimum to zero infrastructure option As an alternative to DIM module, the functions of toll display, nomination, and on off functionality can alternatively be provided by a smart phone application. Such an application allows the user to monitor the vehicle's occupancy on the smart display. A large touchscreen button is programmed into the application to minimize any distraction to the driver who wishes to use the phone for nomination. Nomination is accomplished by taps. One tap is single occupancy, two taps double occupancy etc. Touching and holding the display for a fixed time, such as three seconds turns the toll function on or off, toggling from the last state. Alternatively the display can be divided into two halves, top and bottom, with a soft (touchscreen) button on each half. Holding one half for a time, say 3 seconds, turns on the toll function. Holding the other half the same period turns off the toll function. In this way the on/off and nomination data can be inputted by the driver by feel and with minimum distraction.

Once the nomination and toll collection status have been input to the phone by the user, the application will then connect to the server over the interne link to the service center to relay the data. The service center then uses this data (occupancy, toll service on or off) in addition to the data received from the OBU to calculate the proper toll charges. Alternatively, SMS data messages can be used to relay the required data, either from the smart phone or any other phone that supports SMS messaging.

Another alternative embodiment with a smart phone application is to include the functionality of storing and matching the TMPs in the smart phone, and/or determining distance travelled in the smart phone application as well. In fact, all functions described as carried out by the OBU in the description above, can be implemented in a smart phone application by taking advantage of the common carrier data connectivity of the smart phone and the GPS location capability included in every smart phone. In this way the required toll functionality described in this application can reside completely on the smart phone, with the exception of the low power data radio link used to communicate outside the vehicle for the purpose of enforcement as described above. In order to address the enforcement issue, the OBU device can be modified to consist of a Bluetooth® connection integrated with the low power wireless data connect described above. This will be a much lower cost OBU compared to the full function OBU, and allows use of the smart phone data connect which may be much lower data access cost than a dedicated data link from the OBU to the common carrier network. This approach connects, or marries, the smart phone to the vehicle via license plate data that is embedded in the OBU. In addition to a local broadcast or two way communication of the license plate data to local machines for manual and automated enforcement coordination as described above, the encrypted license plate data can be communicated over the Bluetooth® link to the phone and then over the common carrier data link to the back office, so that the toll system can determine that the toll payment from the smart phone matches a particular vehicle, and any enforcement action such as processing a violation image can be negated at the back office. One disadvantage of this approach is that is that turning on GPS functionality on the smart phone will significantly reduce battery life because of the typically high current consumption of GPS modules. To mitigate this disadvantage, the OBU could also add a GPS receiver. Since the OBU is vehicle powered this does not impact smart phone battery life. GPS data is then relayed to the smart phone application over the Bluetooth® link to obtain the requisite GPS data to complete the toll collection process, but without the need to turn on the smart phone GPS, which increases current consumption and reduces the phone's battery life.

In addition, the OBU can be configured to send a message to the service center as the vehicle approaches a TMP. This message can then be used to prompt the service center to send a message to the smart phone via any available data link with the current toll charge so this can be displayed on the smart phone display. Each of data entry of data display functions described for the smart phone application are accompanied by distinctive audible alerts so the driver knows has feedback on data entry and knows when to pay attention to the display when the upcoming toll charge is displayed One advantage of the system described herein to conventional toll collection using fixed infrastructure points (typically using Dedicated Short Range Communications (DSRC), Radio Frequency Identification (RFID), or License Plate Readers (LPR)) is the ability to easily select "virtual" toll points that can be located anywhere on the roadway. This provides a tremendous amount of flexibility for transportation planners and eliminates many limitations designers of toll facilities encounter in setting up toll systems. In addition, this flexibility can be taken advantage of to maximize the accuracy of the GPS based toll function. GPS statistical accuracy may be better at some locations than others, due to various factors such as multi-path interference, RF interference, and the effective view of the sky (elevation angle at the various points around the compass) and therefore the constellation of GPS satellites that are likely to be received by the unit. Therefore the precise physical point where the vehicle toll is collected (or position match made) can be selected specifically to be at a location where the statistical accuracy is better than another location. Further these locations need not be static, the location that is used as an effective toll point can change based on factors such as the current GPS satellite configuration, or based on the type of installation (location in the vehicle) to maximize the accuracy of the toll collection determination. This can be accomplished either dynamically downloading new TMP's as circumstances warrant, or by including data from toll points that are expected to have more accurate GPS data at that particular point in time and not including those that are expected to be less accurate at that particular point in time. Excess TMP's can be downloaded to the OBU to provide an excess number to allow for the fact that at certain points in time only some of the TMP's will contribute data to the toll collection process.

The accuracy of the GPS fixes at the toll points can be established by correlating the measured performance to certain configurations of the satellite constellation, or by dynamically measuring the accuracy of the GPS fix at the TMP's. This can be done by static monitors in or near the TMP's. These units will typically consist of a battery or wayside powered OBU and are placed at a known location proximate to the TMP's when the deviation from the known location at those TMP's exceeds a threshold, the corresponding TMP is no longer considered in the toll charge determination until the accuracy returns. Similarly, TMP accuracy tests can be done by periodically driving test vehicles in a known lane and verifying that the OBU is reporting in the correct lane. If errors exceed a threshold for a period of time, then data from that TMP is considered to be lower accuracy and is not considered in toll determination for that period of time.

Another approach that can be implemented is a master TMP that consists of several TMP's within a much larger TMP segment. For example, a master TMP might consist of a section of road 2.5 KM long. This TMP segment is then broken up into 5 subsegments that are each 300 meters long.

Each subsegment TMP is then evaluated on its own. Typically, the subsegments are selected where possible to give different views of the GPS satellite configuration. If the TMP processing algorithm determines that a certain threshold ratio of subsegment TMP's are traversed, then the entire segment is determined to have been traversed. For example, in this case we might set the threshold to determine that 4 of the 5 300 meter subsegment TMP's have been traversed, and thus determine that the toll is due for traversing the associated master TMP segment.

In addition to the toll applications described herein, another application of the OBU on the vehicle with a low power radio data connect is to determine when two pieces of mobile equipment, such as a tractor and a trailer are in proximity to each other with a minimum of data utilization. One possible approach is to continually track each piece of mobile equipment using GPS monitoring over a common carrier network, and set up a back office function to determine, by comparing GPS fix data, when the two pieces are in sufficient proximity to each other and sending out an alert. However, this approach has the disadvantage that frequent GPS data points need to be sent over the common carrier network, increasing data utilization costs.

An alternative approach is to use the low power UHF data connect on the OBU to probe by sending connect message to see if another piece of OBU equipment is within range of the first piece of equipment. If a connection is established over the low power radio link, it is known that the two pieces of equipment are generally proximate to each other. To further refine this proximity measurement, the two OBU's share GPS data over the low power data radio link and either or both OBU's can compare the location of the proximate unit's GPS coordinates to its own. When such coordinates are compared and found to be within an adjustable threshold, an alert message is sent indicating that the mobile equipment pieces are in proximity. If the low power link is later broken or GPS comparison shows they are no longer proximate, in accordance with the defined configurable threshold, an alert can also be sent. In this way, proximate location can be determined simply by sending event-driven messages when the proximate status changes and without sending frequent messages to track the mobile equipment pieces on an ongoing basis, and therefore at much lower data communications cost.

The OBU can also be configured to communicate with the vehicle sensors, on board computer, or other on board equipment installed by the vehicle OEM. This could be accomplished via the OBD port or wirelessly using the OBU radio interface which could use any number of communication protocols, for example the Bluetooth® protocol. In this case the OEM vehicle software and hardware could allow for the occupancy nomination to be inputted by the user into an OEM supplied vehicle interface 362, and driver feedback functions described for the DIM above can be displayed or communicated to the driver using visual 360 and audible (not shown) driver feedback interfaces provided by the OEMs in the vehicle. In addition, vehicle occupancy entered by the user can be automatically determined or cross checked using OEM sensors such as seat sensors used to determine if a seat is occupied for the purpose of airbag deployment. Other sensors such as in-vehicle cameras could take images of the interior of the vehicle (visible light or special wavelengths such as IR) and be processed by the on board computer to determine occupancy status of the vehicle. The occupancy nomination data, and auto detect data can then be sent wirelessly to the OBU and communicated back over the common carrier network or using the techniques described below.

The approach described above can be used where the OBU uses the GPS to determine toll point and communicate via common carrier, or where the toll is determined by direct communication with the roadside via the low power radio communication contained in the OBU. In addition, the OBU can incorporate one or more RFID protocols used for conventional toll collection protocols and communicate the occupancy nomination and detection data to the toll system via data embedded in one or more of the RFID protocols in the tag as it passes a roadside RFID reader.

What is claimed is:

1. A system, comprising:

an onboard toll unit configured to:

receive data from an occupancy sensor included in a vehicle, and transmit the occupancy information to a server; and an application configured to be executed by a user device, wherein the application is configured to:

receive manually entered occupancy data, and transmit the manually entered occupancy data to the server.

2. The system of claim 1, wherein when receiving manually entered occupancy data, the application is configured to receive occupancy data entered by an occupant of the vehicle.

3. The system of claim 1, wherein said application is further configured to receive toll-related information entered by an occupant of the vehicle.

4. The system of claim 1, further comprising:

a vehicle display, wherein the onboard toll unit is further configured to receive toll information from the server, and wherein the vehicle display is configured to display the received toll information.

5. The system of claim 1, wherein the application is configured to transmit the manually entered occupancy data to a tolling system via a cellular network.

6. The system of claim 1, wherein the application is further configured to:

receive toll information from the server, and output, to a display of the user device, the toll information.

7. The system of claim 1, wherein when receiving data from an occupancy sensor, the onboard toll unit is configured to receive occupancy information from seat sensors included in the vehicle.

8. The system of claim 1, wherein when receiving data from an occupancy sensor, the onboard toll unit is configured to receive occupancy information from an infrared sensor.

9. The system of claim 1, wherein the occupancy sensor comprises:

a camera and an image processor, wherein the camera is configured to generate an image of vehicle occupants, and wherein the image processor is configured to:

determine vehicle occupancy based on the image, and wirelessly communicate the vehicle occupancy to the onboard toll unit.

10. The system of claim 1, wherein the user device comprises a smart phone.

11. A system, comprising:

an onboard toll unit configured to receive data from an occupancy sensor included in a vehicle, and to transmit occupancy information to a server;

a display configured to display data from the onboard toll unit; and an application configured to be executed by a user device, wherein the application is configured to:

receive manually entered occupancy data, and transmit the manually entered occupancy data to the server.

12. The system of claim 11, wherein the application is configured to receive the manually entered occupancy data from an occupant of the vehicle.

13. The system of claim 11, wherein the display is configured to display toll information received by the onboard toll unit.

14. The system of claim 11, wherein the application is configured to transmit the occupancy data to the server via a cellular network.

15. The system of claim 11, wherein the application is further configured to:

receive toll information from the server.

16. The system of claim 15, wherein the application is further configured to:

output, to a display of the user device, the toll information.

17. The system of claim 11, wherein when receiving data from an occupancy sensor, the onboard toll unit is configured to receive occupancy information from seat sensors included in the vehicle.

18. The system of claim 11, wherein when receiving data from an occupancy sensor, the onboard toll unit is configured to receiving occupancy information from an infrared sensor.

19. The system of claim 11, wherein the occupancy senor comprises:

a camera configured to generates an image of vehicle occupants; and an image processor configured to:

determine vehicle occupancy based on the image, and wirelessly communicate the vehicle occupancy to the onboard toll unit.

20. The system of claim 11, wherein the user device comprises a smart phone.

* * * * *